Nov. 8, 1955 W. R. KING 2,722,995
DUST REMOVAL SYSTEM
Filed Dec. 15, 1952 3 Sheets-Sheet 1

INVENTOR.
W. R. King
BY
Hudson & Young
ATTORNEYS

Nov. 8, 1955
W. R. KING
2,722,995
DUST REMOVAL SYSTEM
Filed Dec. 15, 1952
3 Sheets-Sheet 2
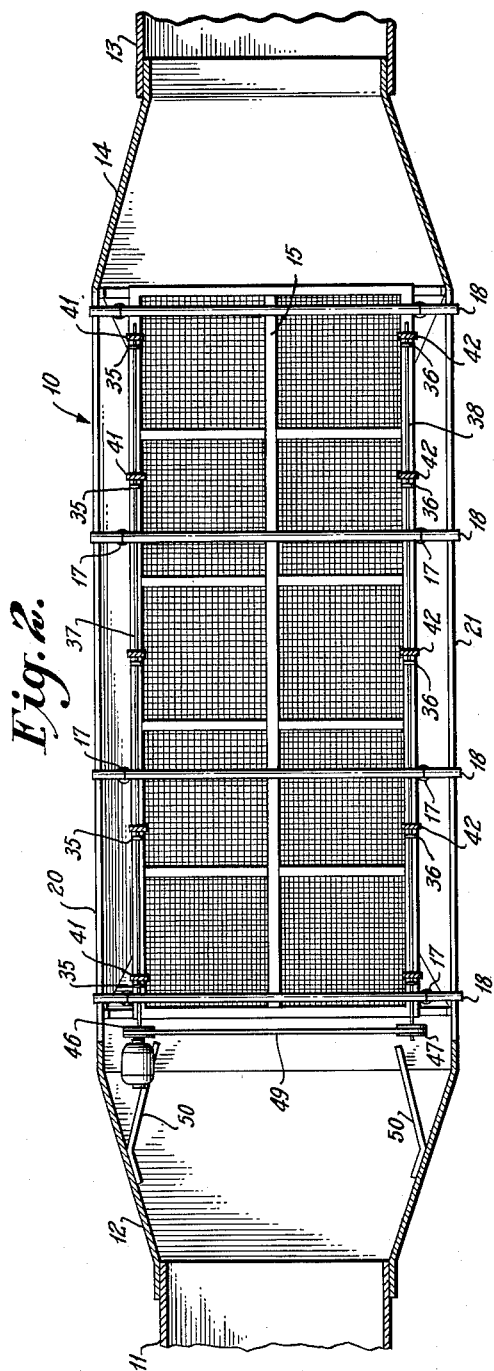
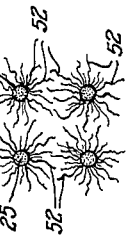
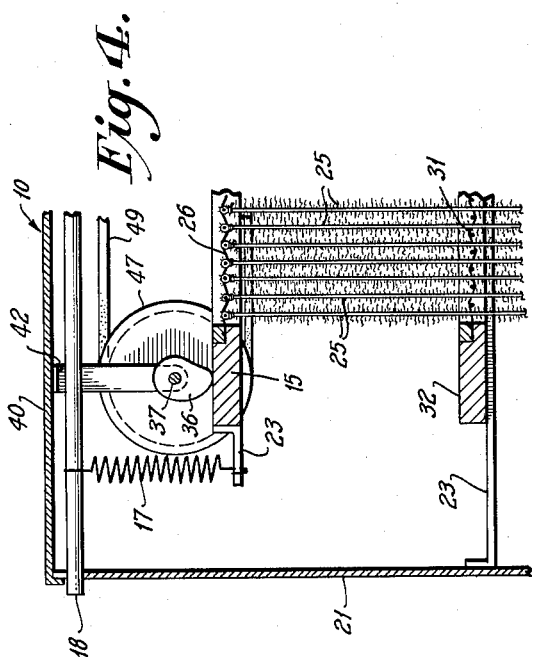
INVENTOR.
W. R. King
BY
Hudson & Young
ATTORNEYS

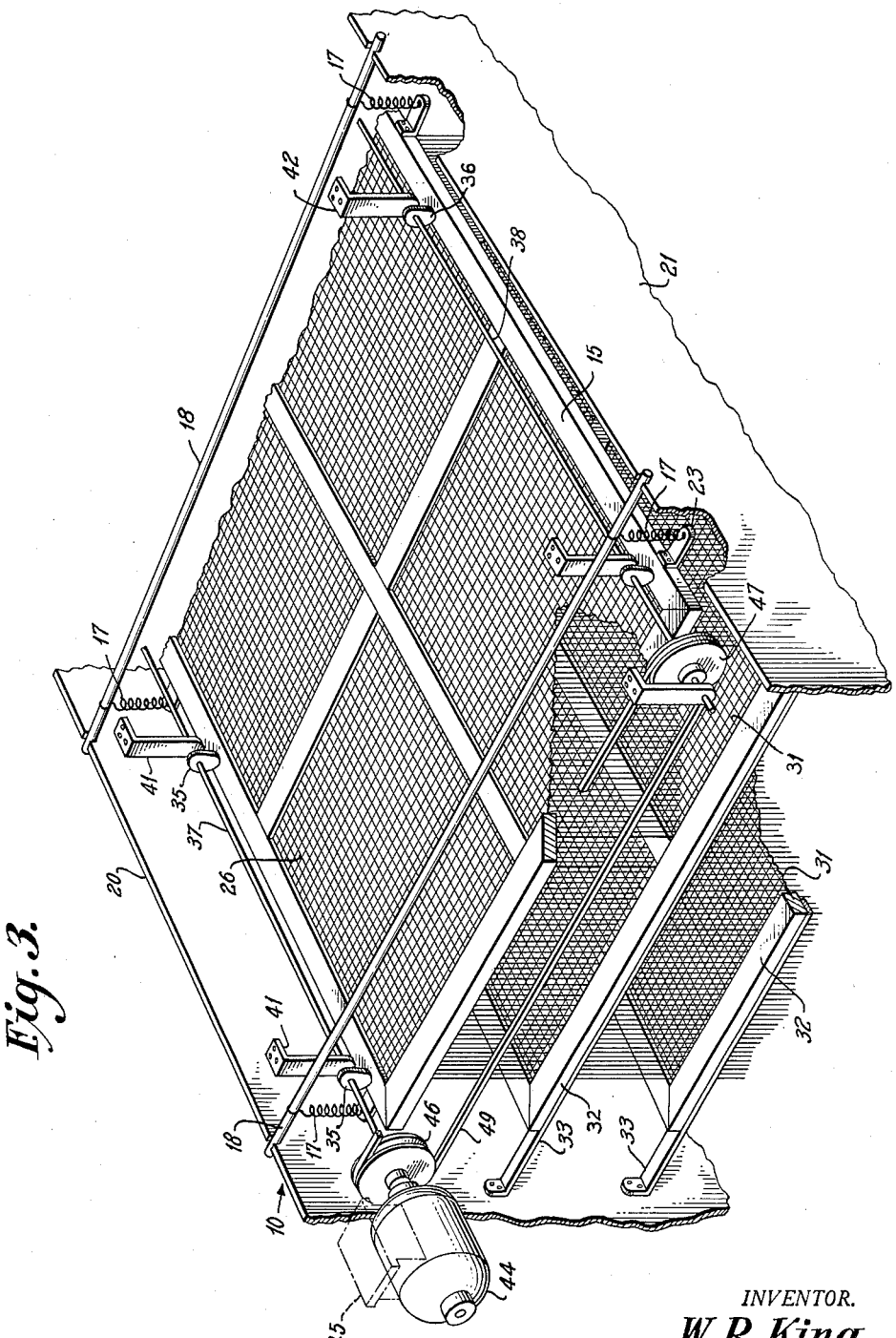

United States Patent Office 2,722,995
Patented Nov. 8, 1955

2,722,995
DUST REMOVAL SYSTEM

William R. King, Bartlesville, Okla., assignor to Phillips Petroleum Company, a corporation of Delaware Application December 15, 1952, Serial No. 325,973

1 Claim. (Cl. 183—58)

This invention relates to a method of and apparatus for removing dust particles suspended in gases.

The problem of removing solid particles from gas streams has become increasingly important in modern industry from both the point of view of abating smoke nuisances and the recovery of the suspended particles. This is particularly true in the production of carbon black. While various procedures are known in the art that are capable of removing a portion of the suspended carbon particles, none of the known devices provide the desired purification on a commercial basis at a reasonable cost. The operation of most presently known dust removal systems is based upon the filtering action of a fine mesh screen disposed in the gas flow. Such a screen utilizes a tightly woven filter cloth of fine diameter threads or strands so that the resulting small interstices prevent all or substantially all of the dust particles from passing therethrough. A second known system relies upon the dust particles themselves to do the filtering because a porous dust cake acts as a filter. However, both of these systems have several shortcomings which limit their usefulness in carbon black removal. The dust particles tend to adhere to the filter threads and gradually block the gas passage therethrough such that it becomes necessary to remove the caked particles periodically. This is usually accomplished by some type of elaborate and expensive shaking mechanism or by stopping the operation for cleaning purposes. A second and distinct disadvantage of these filtering systems is the excessive pressure drop which results from the tightly formed mesh screen. This requires additional pumping facilities to maintain normal gas flow.

In accordance with the present invention there is provided a dust removal system which utilizes the property of self agglomeration possessed by many dusts including carbon black. This system employs a medium which promotes agglomeration and permits the collected dust particles to be removed from the medium with little re-entrainment and without interruption of the gas flow. The collecting medium itself comprises an open maze of strings hanging vertically in relatively widely spaced relation to one another, that is, the spacing between individual strings is not so small that filtering occurs. The dust laden gas enters the system at right angles to the strings and passes through the entire depth thereof. The baffle action of the individual strings causes the dust to deposit thereon and the open nature of the string arrangement permits the dust to fall out the bottom by gravity after very slight agitation of the strings. The resulting pressure drop of the gas passed therethrough is extremely low such that little if any auxiliary pumping equipment is needed.

Accordingly, it is an object of this invention to provide an improved method of treating gas streams to remove solid particles suspended therein which relies in part upon the self agglomeration property of the particles being removed.

Another object is to provide a dust removal system which effects continuous removal of solid particles suspended in a gas stream with a minimum pressure drop.

A further object is to provide dust removal and collecting apparatus which is economical to build, of durable construction and which employs a minimum number of moving parts.

Various other objects, advantages and features of this invention should become apparent from the following detailed description taken in conjunction with the accompanying drawings in which:

Figure 2 is a plan view of the system illustrated in Figure 1;

Figure 3 is a perspective view of the dust removal system showing portions thereof in detail;

Figure 4 is a view taken along the line 4—4 in Figure 1; and

Figure 5 is a cross-sectional view illustrating the spacing between individual dust collecting strings.

Figure 1:
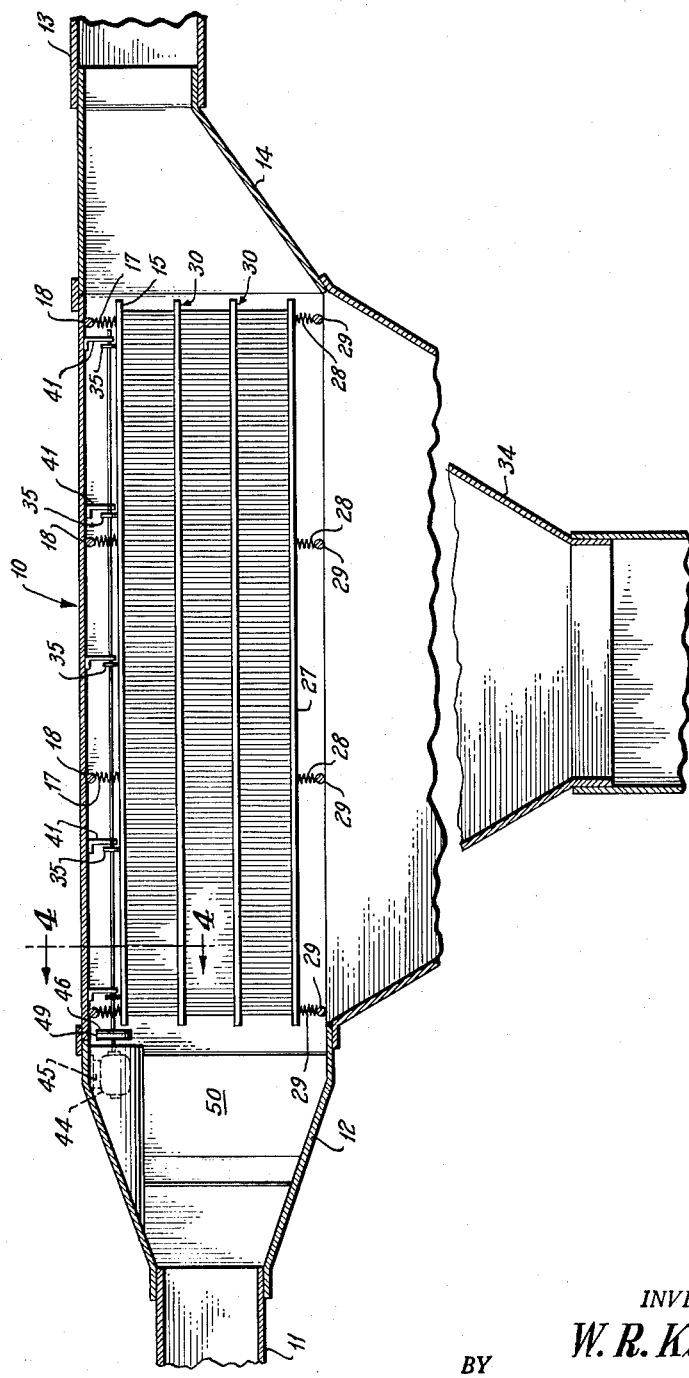
Figure 1 is a vertical elevation view shown partially in section of a dust removal system embodying the principles of this invention.

Referring now to the drawings in detail and to Figures 1 and 2 in particular, there is illustrated a dust removal chamber 10 into which is directed a dust laden gas stream through an inlet conduit 11 which is attached to chamber 10 by a connecting conduit 12. The second end of chamber 10 is connected to an outlet conduit 13 by a second connecting conduit 14. In the illustrated embodiment of this invention, chamber 10 is generally rectangular in shape for convenience of construction. A rectangular frame member 15 is positioned in the upper region of chamber 10 by means of a plurality of suspension springs 17 which are secured at their upper ends to corresponding support rods 18 which extend transversely across chamber 10 between vertical walls 20 and 21. The lower ends of spring 17 are secured to brackets 23 which in turn are attached to frame member 15. A large number of vertically aligned strings 25, see Figure 3, are suspended from frame member 15. This suspension is accomplished by fastening the upper ends of individual string 25 to the intersections of a wire screen 26 which extends across and is fastened to frame member 15. The lower ends of strings 25 are similarly fastened to a second wire screen extending across and fastened to a second frame member 27. A plurality of springs 28 secure frame member 27 to corresponding transverse rods 29 extending between walls 20 and 21. Springs 17 and 28 thus maintain the individual strings 25 under tension such that they remain out of contact with one another. To further prevent such contact, a plurality of guide members 30 is positioned horizontally across chamber 15 in the region between frames 15 and 27. These guide members comprise wire screens 31 fastened to frames 32, which in turn are supported by shelves 33 extending between walls 20 and 21. Strings 25 pass through individual open spaces in screens 31 and are thus retained in vertical alignment out of contact with one another. A hopper 34 is attached to the lower side of chamber 10 and leads to a collecting bin, not shown.

For reasons which will become apparent hereinafter, it is desirable to impart vibratory motion to the vertically suspended strings 25. This is accomplished by a plurality of cams 35 and 36 which are mounted on respective drive shafts 37 and 38. Drive shaft 37 is suspended from the top plate 40 of chamber 10 by a plurality of brackets 41 and drive shaft 38 is suspended from top plate 40 by a plurality of brackets 42. Rotary motion is imparted directly to drive shaft 36 by an electric motor 44 which also is suspended from plate 40 by a mounting bracket 45. A first pulley 46 is mounted on drive shaft 37 and a second pulley 47 is mounted on drive shaft 38, the two pulleys being interconnected by a belt 49 such that the rotary motion imparted to drive shaft 37 is also imparted to drive shaft 38. As illustrated in greater detail in Figure 4, cams 35 and 36 are positioned such that frame member 15 is pushed downward by rotation of cams 35 and 36 to a first position. Further rotation of these cams releases the downward force whereby springs 17 return frame member 15 to its normal position. Thus rotation of cams 35 and 36 imparts vibratory motion to frame member 15 and to the strings 25 suspended therefrom.

The operation of the dust removal system of this invention should now become apparent. A stream of gas having solid particles suspended therein enters the system through conduit 11 and is directed by baffles 50, see Figure 2, through vertically suspended strings 25. Because of the large number of vertical strings in chamber 10, the gas stream is directed in a tortuous path as it passes through the string section and outward through conduit 13. The dust particles suspended in the gas stream are attracted to strings 25 by the forces of adhesion between the dust particles and the strings. The various dust particles attracted to the strings are held to one another by forces of cohesion which promote their agglomeration until the resulting particles are large enough to be dislodged from the strings and collected. The periodic vibratory motion imparted to strings 25 aids in loosening the attached particles from the strings such that they continuously fall downward by the force of gravity into the collecting bin.

In Figure 5 there is illustrated a horizontal sectional view of four of the individual strings 25. These strings preferably are constructed of a fuzzy material having fibers 52 extending outwardly therefrom. Suitable materials which can be employed in this manner include cotton, wool, hemp and various synthetic fibers which are presently available commercially. The particular material chosen for the construction of strings 25 depends in part upon the temperatures encountered in the stream of flowing gas. The spacing between individual strings 25 is of considerable importance to satisfactory operation of the dust removal system of this invention. The individual strings are spaced at a sufficient distance from one another that filtering does not occur, that is, the forces of adhesion between the particles and the strings are relied upon for the entrapment of the particles rather than the physical blocking action of a conventional filter. In this respect the strings should be placed such that the extremities of fibers 52 barely touch one another as a lower limit and such that the extremities of fibers 52 are at a distance approximately 300 times the diameter of the smallest particles normally to be removed from the gas stream as an upper limit. A spacing between strings of approximately 100 times the average particle diameter is preferred for most applications. Spacing of such magnitude avoids an accumulation of dust between the individual strings which would considerably increase the pressure drop through the system. Such a pressure drop increases as approximately the inverse square of the distance between the strings. By providing a large number of strings spaced relatively far apart, dust removal is accomplished with a minimum pressure drop. This is true because the pressure drop in the system of this invention increases as only the first power of the number of strings through which the gas stream circulates.

In order to accomplish substantial removal of the solid particles suspended in the gas stream, it is desirable that the length of string path through which the gas circulates be at least approximately four times the length of the individual strings 25. The importance of such an elongated flow path configuration becomes apparent from a consideration of the operation of the system. The solid particles which are entrained by the strings near the inlet opening intermittently fall downward into the collection bin. As these particles fall from the top of the first strings, they are carried by the gas flow into the region of adjacent strings and thus must be removed from the gas stream once again. Accordingly, it is necessary that an elongated path be provided to effect complete removal of that portion of the gas stream which passes through the lower regions of chamber 10. Satisfactory results can be obtained on a commercial scale with the length of strings 25 varying from approximately six inches to approximately ten feet, although for most operations it is desirable that the strings vary in length from approximately four feet to approximately six feet. The vibration imparted to frame member 15 need not be of large magnitude. Satisfactory results can be obtained by a downward displacement of the frame member of from one-sixteenth to one-eighth inch. Vibrations of greater magnitude are permissible but not necessary for satisfactory removal of the dust particles. The number of strings disposed in the path of the circulating gas depends, of course, to a large extent on the degree of filtering desired or necessary and on the velocity of gas flow through the system.

From the foregoing description it should be apparent that there is provided in accordance with this invention improved dust removal and collection apparatus which affords removal of solid particles suspended in a gas stream with a minimum pressure drop. This device is capable of operating in a continuous manner which eliminates the standby units, elaborate valving and checking devices, and the extra pump capacity which is required in most presently available filtering devices. While this invention has been described in conjunction with a present preferred embodiment, it should be apparent that various changes in details of construction can be made by those skilled in the art without departing from the scope of this invention. For example, the screen suspension and cam vibrating mechanism are merely illustrative of one particular embodiment. Various other devices obviously can be designed to impart the desired vibratory motion to the strings; and the particular suspending means need not be in the form of a wire screen, but rather the individual strings can be suspended in any desired manner. Accordingly, it is not intended that this invention be limited to the precise illustrated embodiment.

What is claimed is:

Apparatus to remove solid particles suspended in a gas comprising a chamber having inlet and outlet openings through which a gas stream can be circulated in substantially a horizontal direction, a frame member enclosing a screen defined by two groups of parallel wires the wires of one group being at right angles to the wires of the other group, a plurality of springs suspending said frame in the upper portion of said chamber whereby said screen is in substantially a horizontal plane, strings suspended from the intersections of the wires forming said screen, said strings being formed of a material having fibers protruding therefrom, the spacings of the wires of said screen being such that the extremities of the fibers of one string contact the extremities of the fibers of adjacent strings, means secured to the lower ends of said strings to apply tensions thereto, at least one guide member comprising a second screen positioned horizontally in said chamber whereby said strings extend through individual openings in said second screen, a plurality of rotatable cams arranged to impart a downward displacement periodically to said frame member to impart vibratory motion to said strings, and means positioned beneath said chamber to collect the particles removed from the vibrating strings.

References Cited in the file of this patent

UNITED STATES PATENTS

| | | |
|---|---|---|
| 569,644 | Jacobson et al. | Oct. 20, 1896 |
| 1,094,521 | Brauer | Apr. 28, 1914 |
| 1,755,011 | Ludlam | Apr. 15, 1930 |
| 2,085,155 | Heidbrink | June 29, 1937 |

FOREIGN PATENTS

| | | |
|---|---|---|
| 309 | Great Britain | Jan. 6, 1893 |
| 195,203 | Great Britain | Mar. 29, 1923 |
| 461,145 | France | Oct. 22, 1913 |
| 518,533 | France | Jan. 4, 1921 |